United States Patent
Li et al.

(10) Patent No.: US 10,272,641 B2
(45) Date of Patent: Apr. 30, 2019

(54) GYPSUM PRODUCTS WITH FORTIFIED GLASS FIBER MAT

(71) Applicant: United States Gypsum Company, Chicago, IL (US)

(72) Inventors: Alfred Li, Naperville, IL (US); Naser Aldabaibeh, Homer Glen, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 515 days.

(21) Appl. No.: 14/306,859

(22) Filed: Jun. 17, 2014

(65) Prior Publication Data
US 2015/0360439 A1    Dec. 17, 2015

(51) Int. Cl.
| B32B 5/26 | (2006.01) |
| C03C 25/52 | (2006.01) |
| C03C 25/64 | (2006.01) |
| C03C 25/16 | (2006.01) |
| B32B 5/14 | (2006.01) |
| B32B 13/14 | (2006.01) |

(52) U.S. Cl.
CPC ............... *B32B 5/26* (2013.01); *B32B 5/145* (2013.01); *B32B 13/14* (2013.01); *C03C 25/16* (2013.01); *C03C 25/52* (2013.01); *C03C 25/64* (2013.01); *B32B 2250/03* (2013.01); *B32B 2250/40* (2013.01); *B32B 2255/02* (2013.01); *B32B 2255/20* (2013.01); *B32B 2260/02* (2013.01); *B32B 2260/023* (2013.01); *B32B 2260/044* (2013.01); *B32B 2262/101* (2013.01); *B32B 2419/00* (2013.01); *B32B 2607/00* (2013.01); *Y10T 442/2008* (2015.04); *Y10T 442/2525* (2015.04); *Y10T 442/2992* (2015.04); *Y10T 442/665* (2015.04)

(58) Field of Classification Search
USPC ....... 442/60, 266; 428/212, 219; 156/44, 78; 427/209
See application file for complete search history.

(56) References Cited

U.S. PATENT DOCUMENTS

| 4,647,496 | A |  | 3/1987 | Lehnert et al. |
| 5,637,362 | A |  | 6/1997 | Chase et al. |
| 5,772,846 | A |  | 6/1998 | Jaffee |
| 6,180,715 | B1 | * | 1/2001 | Schmidt ............... C08G 73/024 428/35.2 |
| 6,955,844 | B2 |  | 10/2005 | Tagge et al. |
| 7,273,579 | B2 |  | 9/2007 | Miller et al. |
| 8,187,418 | B2 |  | 5/2012 | Manville |
| 8,329,308 | B2 |  | 12/2012 | Liu et al. |
| 2002/0187296 | A1 |  | 12/2002 | Hauber et al. |
| 2008/0099122 | A1 |  | 5/2008 | Andersen et al. |
| 2008/0152945 | A1 |  | 6/2008 | Miller et al. |

(Continued)

OTHER PUBLICATIONS

Chinese Office Action from corresponding Chinese Patent Application No. 201580031066.X, dated May 17, 2018.

*Primary Examiner* — Lynda Salvatore
(74) *Attorney, Agent, or Firm* — Greer, Burns & Crain, Ltd.; Pradip Sahu; Philip T. Petti

(57) ABSTRACT

A gypsum product with a fortified glass fiber mat is provided in which the glass fiber mat is strengthened by crystallization of salt crystals on the glass fiber mat prior to the glass fiber mat use in the gypsum product. Methods for making a glass fiber mat saturated with salt crystals and gypsum products with the glass fiber mats are provided as well.

18 Claims, 5 Drawing Sheets

(56) References Cited

U.S. PATENT DOCUMENTS

| | | |
|---|---|---|
| 2009/0029141 A1 | 1/2009 | Shake et al. |
| 2009/0208714 A1* | 8/2009 | Currier .................... B28B 1/52 |
| | | 428/212 |
| 2010/0143682 A1 | 6/2010 | Shake et al. |
| 2011/0086214 A1 | 4/2011 | Rockwell |
| 2011/0262733 A1 | 10/2011 | Roosen et al. |
| 2012/0148806 A1 | 6/2012 | Dubey et al. |
| 2013/0216762 A1 | 8/2013 | Chan et al. |
| 2013/0330536 A1* | 12/2013 | Yeung .................... B32B 13/14 |
| | | 428/304.4 |

* cited by examiner

GYPSUM PRODUCTS WITH FORTIFIED GLASS FIBER MAT

FIELD OF THE INVENTION

This invention provides gypsum products with improved nail-pull strength and made with fortified glass fiber mats, and compositions and methods for manufacturing the fortified glass fiber mats.

BACKGROUND

Various gypsum products, including wall panels, ceiling panels and tiles, are commonly used in the construction industry. Many of these gypsum products are made by preparing an aqueous gypsum slurry with calcined gypsum (calcium sulfate alpha hem ihydrate, calcium sulfate beta hemihydrate and/or calcium sulfate anhydrate), shaping the slurry and then allowing the slurry to harden by rehydrating calcined gypsum into gypsum (calcium sulfate dihydrate).

Gypsum panels can be manufactured by sandwiching a gypsum slurry between two cover sheets known as facers. In some applications, a facer is a paper sheet. Such wallboards in which a gypsum slurry is sandwiched between two sheets of paper find many different applications in building construction. However, wallboards may be sensitive to moisture and at least in some applications, other facer materials such as fibrous mats can be used as described for example in U.S. Pat. No. 8,329,308 and US Patent Publication 2010/0143682, both to the United States Gypsum Company, and the teachings of which are incorporated herein by reference. Suitable fibrous mats further include those disclosed in U.S. Pat. No. 5,772,846 and which are made with glass fibers and polyester fibers bound together.

While gypsum panels made with glass fiber mats have many advantages, the main disadvantage comes from the glass fiber mat structure in which there are voids between glass fibers, as shown in a micrograph of FIG. 1, which may affect consistency and compressive strength of a resulting gypsum panel. Further, glass fibers are brittle and this may negatively affect certain properties of a resulting gypsum panel, such as nail-pull strength which translates into a suboptimal ability for the panel to hold a nail.

US Patent Publication 2011/0086214 laminates one of the glass mat surfaces with a stiffening layer before the mat can be used in making a gypsum product. US Patent Publication 2002/0187296 discloses an assembly line on which a glass fiber mat is vibrated so that voids in the mat are more evenly filled with a gypsum slurry. However, while these methods fill out glass fiber mat voids, they do not address various issues such as suboptimal nail-pull strength because of brittle glass fibers.

SUMMARY

At least some of these needs are addressed by the present invention. One embodiment provides a gypsum product comprising a gypsum core sandwiched between two glass fiber mats saturated with salt crystals. At least in some embodiments, a glass fiber mat is saturated with a gypsum-forming solution such that gypsum crystals crystalize on glass fibers of the glass fiber mat. The mat is then exposed to a higher temperature in order to dehydrate gypsum crystals into calcium sulfate crystals.

Further embodiments provide methods for making a gypsum product from a gypsum slurry and a glass fiber mat saturated with salt crystals. In these methods, a glass fiber mat is immersed into a salt-forming solution and the solution is caused to crystallize on glass fibers of the mat. In some applications, after the in situ crystallization reaction is completed, the mat is dried at an elevated temperature in a dryer or an oven. A gypsum slurry comprising calcined gypsum and water, and optionally other components such as binders, fillers, fibers, defoamers and plastisizers, is then prepared and is sandwiched between two glass fiber mats saturated with salt crystals. In some methods, two solutions are mixed together to obtain a crystal-forming solution and a glass fiber mat is then immersed in this crystal-forming solution for in situ crystallization on glass fibers. In other methods, a glass fiber mat is immersed in a first solution first and then moved to a second solution. An in situ crystallization reaction on glass fibers takes places when the second solution comes in contact with glass fibers soaked in the first solution.

DETAILED DESCRIPTION

Figure 1:
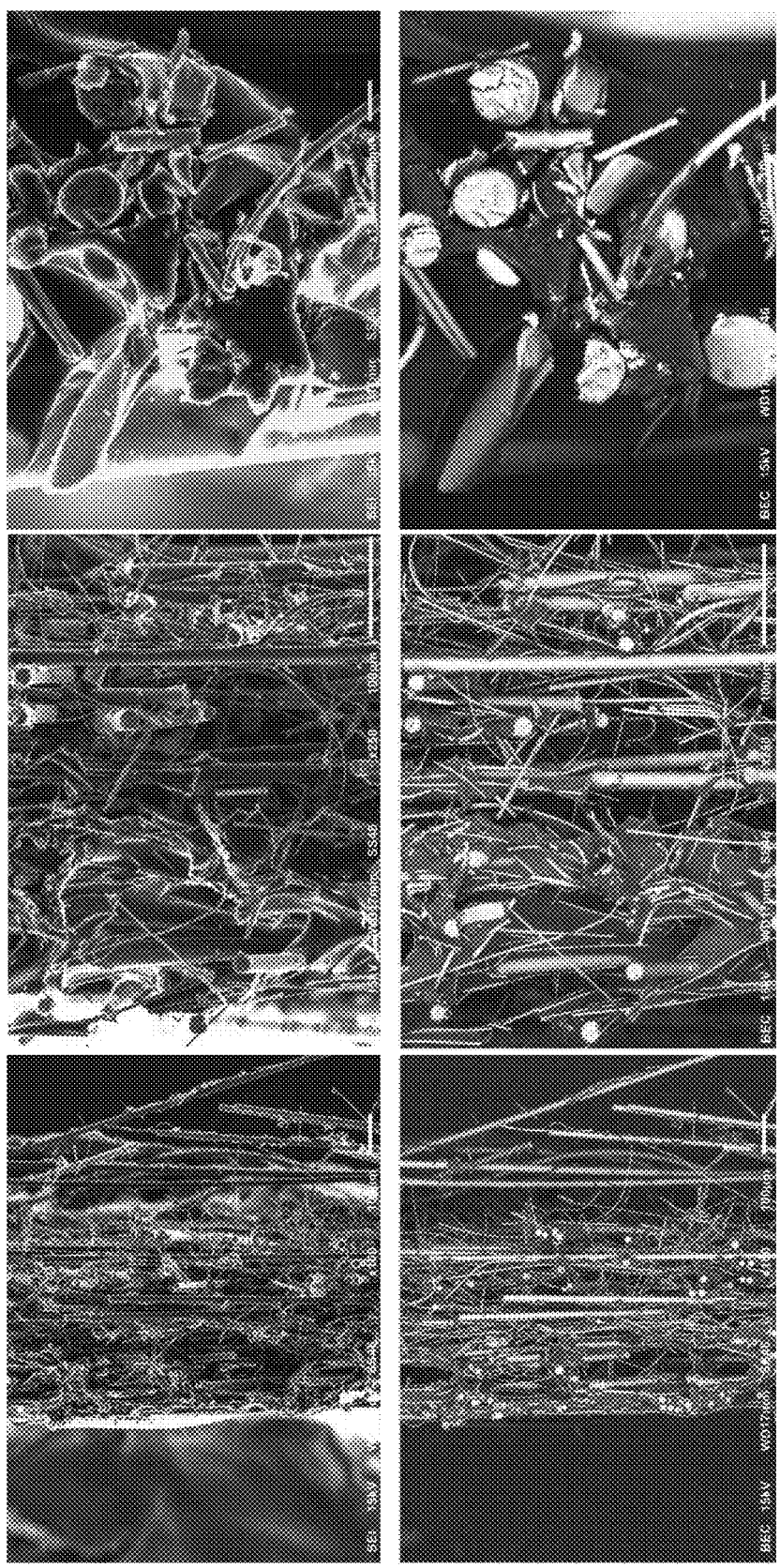
FIG. 1 is a micrograph revealing the structure of glass fiber mat matrix with multiple voids and loose association between glass fibers.

The present invention provides gypsum products, including gypsum panels, with improved nail-pull strength in which a gypsum core is sandwiched between glass fiber mats saturated with salt crystals, including without limitation gypsum crystals, calcium sulfate, sodium chloride and any combinations thereof. Various glass fiber mats without limitations are suitable for making these gypsum products, including mats made with chopped glass fibers, continuous strand glass fibers and mixtures therefore.

At least in some embodiments, a glass fiber mat is prepared from a combination of a thermoplastic polymer and glass fibers. Various thermoplastic polymers are suitable for preparing a glass fiber mat, including polyester, polyethylene, polypropylene, polybutylene and mixtures thereof.

At least in some embodiments, a glass fiber mat can be prepared from glass fibers which are bound together with at least one binder. Suitable binders include, but are not limited to, a styrene acrylic binder. At least in some embodiments, a glass fiber mat is formulated from glass fibers and a binder such that glass fibers comprise from about 50% to about 80% by weight of the mat and a binder comprises from about 10 to about 30% by weight of the mat. One suitable glass fiber mat is the DuraGlass® 8924 Mat, manufactured by Johns Manville and made with about 70% of glass fibers and about 30% of an acrylic binder.

At least in some embodiments, a glass fiber mat can be formulated with fibers in a length of between about 0.5 to about 2.0 inches and a diameter of between about 6 and about 25 microns. At least in some embodiments, a glass fiber mat is formulated with biosoluble microfibers which have a diameter of about 3 microns. Biosoluble microfibers may comprise from 10% to 90% of all glass fibers.

A glass fiber mat can optionally further comprise fillers, pigments, or other inert or active ingredients. For example, the mat can comprise at least one of a coloring pigment, biocide, fungicide, or mixtures thereof. Such additives can be useful to alter the coloration, modify the structure or texture of the surface, improve resistance to mold or fungus formation, and enhance fire resistance.

One embodiment provides a glass fiber mat saturated with salt crystals which were caused to crystallize directly on glass fibers. Any saturated salt solution which can be caused to crystallize on glass fibers can be used. Such solutions include without any limitations, a gypsum-forming solution, sodium chloride and various combinations thereof. Upon crystallization in situ, crystals bind together glass fibers and make glass fibers less brittle.

Embodiments include a fiber glass mat in which at least some glass fibers are bound together with salt crystals. In some embodiments, at least 50% of the thickness of the mat is saturated with salt crystals. In some embodiments, at least 60% of the thickness of the mat is saturated with salt crystals. In some embodiments, nearly 100% of the thickness of the mat is saturated with salt crystals.

In one embodiment, a glass fiber mat is saturated with a gypsum-forming solution so that gypsum crystallization takes place directly on glass fibers. Thus, some embodiments provide a fiber glass mat in which at least some glass fibers are bound together with calcium sulfate crystals. In some embodiments, at least 50% of the thickness of the mat is saturated with calcium sulfate dihydrate crystals. In some embodiments, at least 60% of the thickness of the mat is saturated with calcium sulfate dihydrate crystals. In some embodiments, nearly 100% of the thickness of the mat is saturated with calcium sulfate dihydrate crystals.

Various methods can be employed to crystallize salt crystals on glass fibers of a glass fiber mat in situ. Suitable methods include those in which one saturated solution is used. In these methods, a glass fiber mat is immersed into a crystal-forming solution and crystals are caused to form on glass fibers of the mat. Suitable methods also include a two-solution method in which a glass fiber mat is immersed in a first solution first and then the mat is placed in a second solution which triggers a chemical reaction in which the second solution reacts with the first solution soaked into glass fibers and this causes salt crystallization on glass fibers. Some crystallization methods on glass fibers can be conducted with solutions at the room temperature. Alternatively, suitable solutions can be pre-heated and then optionally cooled down to initiate crystal formation on a glass fiber mat.

Figure 4:
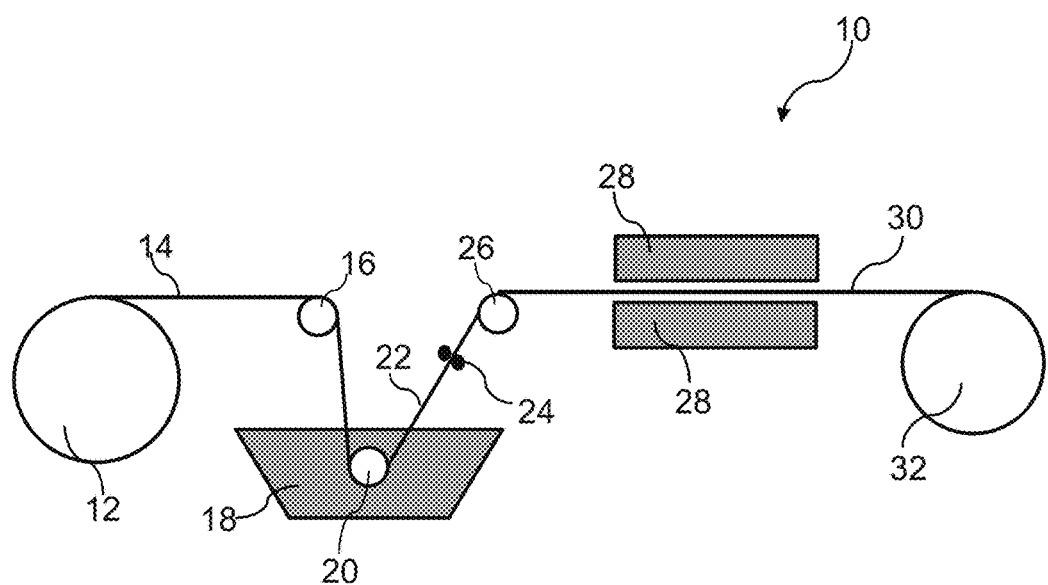
FIG. 4 is a schematic of a glass mat crystallization process by a one-solution method.

FIG. 4 illustrates a system set up, generally 10, for conducting a one-solution method. Referring to FIG. 4, a glass fiber mat 14 is fed from a roll 12 by rolling means 16 into a container with salt solution 18. The glass fiber mat 14 becomes saturated with salt solution in the container 18 and is lifted from the container 18 by rolling means 20. A wet glass fiber mat saturated with salt solution 22 is then passed through a meter 24 and is fed by rolling means 26 onto a conveyer with a dryer 28 where the wet glass fiber mat 22 is dried, the excess of water is evaporated, and the crystallization reaction and bonding of salt crystals to glass fibers is completed. A glass fiber mat saturated with salt crystals 30 exits from the dryer 28 and is rolled into a roll 32.

Suitable methods for making a glass fiber mat saturated with salt crystals also include those in which two solutions are used such that when a first solution is mixed with a second solution, crystal precipitation is initiated. In some embodiments, a first solution can be sodium bisulfate ($Na_2SO_4X10H_2O$) and a second solution can be calcium chloride ($CaCl_2$).

Figure 5:
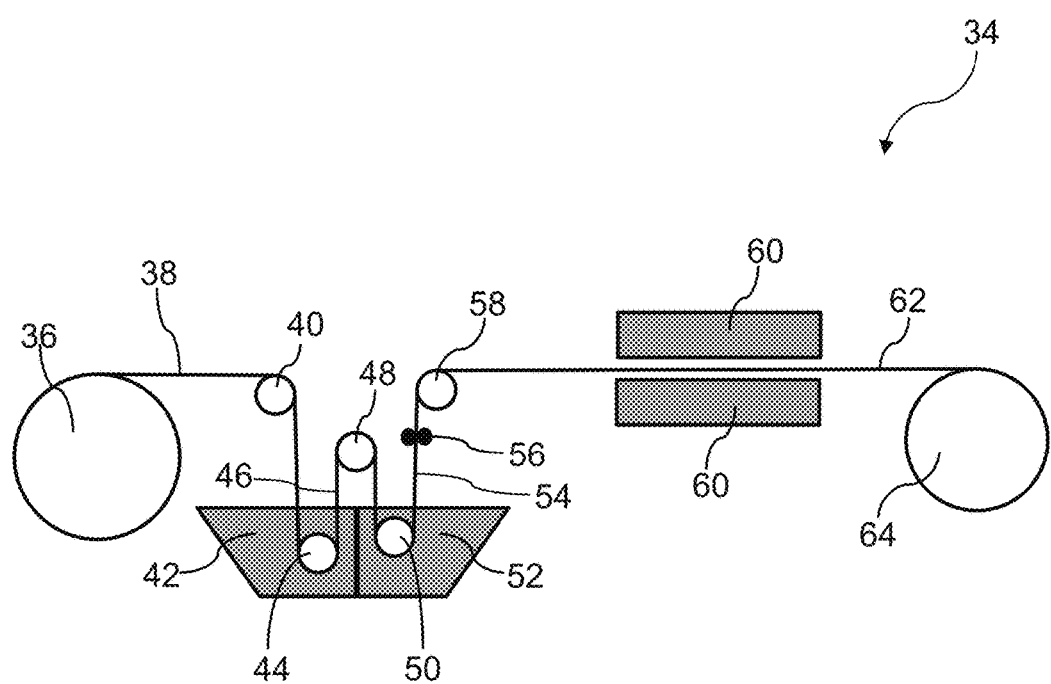
FIG. 5 is a schematic of a glass mat crystallization process by a two-solution method.

FIG. 5 illustrates a system set up, generally 34, for conducting a two-solution method. Referring to FIG. 5, a glass fiber mat 38 is fed from a roll 36 by rolling means 40 into a first container with a first solution 42 where the glass fiber mat 38 is immersed in the first solution. A glass fiber mat soaked in the first solution is then lifted from the first container 42 by rolling means 44. The glass fiber mat soaked in the first solution 46 is then fed by rolling meanings 48 into a second container with a second solution 52. A chemical reaction between the first solution and the second solution takes place and results in precipitation of salt crystals on glass fibers in the second container 52. A wet glass fiber mat saturated with salt solution 54 is then lifted from the second container 52 by rolling means 50 and is passed through a meter 56. The wet glass fiber mat saturated with salt solution 54 is then fed by rolling means 58 on a conveyer with a dryer 60 and is dried, the excess of water is evaporated, and the crystallization reaction and bonding of salt crystals to glass fibers is completed. A glass fiber mat saturated with salt crystals 62 exits from the dryer 60 and is rolled into a roll 64.

While methods shown in FIG. 4 and FIG. 5 utilize a dryer, other crystallization methods can be conducted without a dryer and include those methods in which the bonding of salt crystals to glass fibers is completed at the room temperature and without exposing a glass fiber mat to elevated temperatures. Yet in further embodiments, some crystallization methods may include a step of drying a glass fiber mat saturated with salt crystals in an oven instead of a dryer.

In some embodiments, a fresh concentrated salt solution is obtained and then caused to crystallize on glass fibers in a glass fiber mat such that the glass fiber mat becomes embedded with salt crystals. Any chemical solutions in any suitable concentrations can be used for making a concentrated salt solution.

Various methods can be employed to crystallize calcium sulfate dihydrate on glass fibers in a glass fiber mat in situ. In these methods, a fresh concentrated gypsum solution is obtained and then caused to crystallize on glass fibers in a glass fiber mat such that the glass fiber mat becomes embedded with gypsum crystals. Any chemical solutions in any suitable concentrations can be used for making a concentrated gypsum solution. Such methods include, but are not limited to preparing a sodium bisulfate solution ($Na_2SO_4X10H_2O$) and a calcium chloride ($CaCl_2$) solution and immersing a glass fiber mat in freshly mixed sodium bisulfate and calcium chloride solutions. Mixing appropriate amount of a sodium bisulfate solution with a calcium chloride solution results in a concentrated gypsum solution and thereby initiates a chemical reaction in which gypsum crystals are formed. Immersing a glass fiber mat in freshly mixed sodium bisulfate and calcium chloride triggers crystallization of gypsum crystals on glass fibers and formation of a glass fiber mat saturated with gypsum crystals. Sodium bisulfate and calcium chloride can be used in different amounts suitable to obtain a concentrated gypsum solution upon mixing. At least in some embodiments, sodium bisulfate and calcium chloride are used as 0.1 M solutions. In other embodiments, they can be used as 0.1, 0.2, 0.3, 0.4, 0.5, 0.6, 0.7, 0.8, 0.9 or 1M solutions. At least in some embodiments, the molar ratios between sodium bisulfate and calcium chloride is 1:1. At high concentrations of sodium bisulfate and calcium chloride, Sodium Chloride can also form crystals on glass fibers.

The in situ gypsum crystallization reaction on glass fibers can be carried out at the room temperature for a period of time sufficient to completely saturate a glass fiber mat with gypsum crystals. At least in some embodiments, the in situ crystallization reaction is carried out by immersing a glass fiber mat into a freshly mixed sodium bisulfate/calcium chloride solution for at least 1-30 minutes. The reaction can be carried out for any period of time sufficient to saturate a glass fiber mat with gypsum crystals either completely or partially. In some embodiments, the reaction is carried out until 20%, 30%, 40%, 50%, 60%, 70%, 80%, 90% or nearly 100% saturation is achieved.

Figure 2:
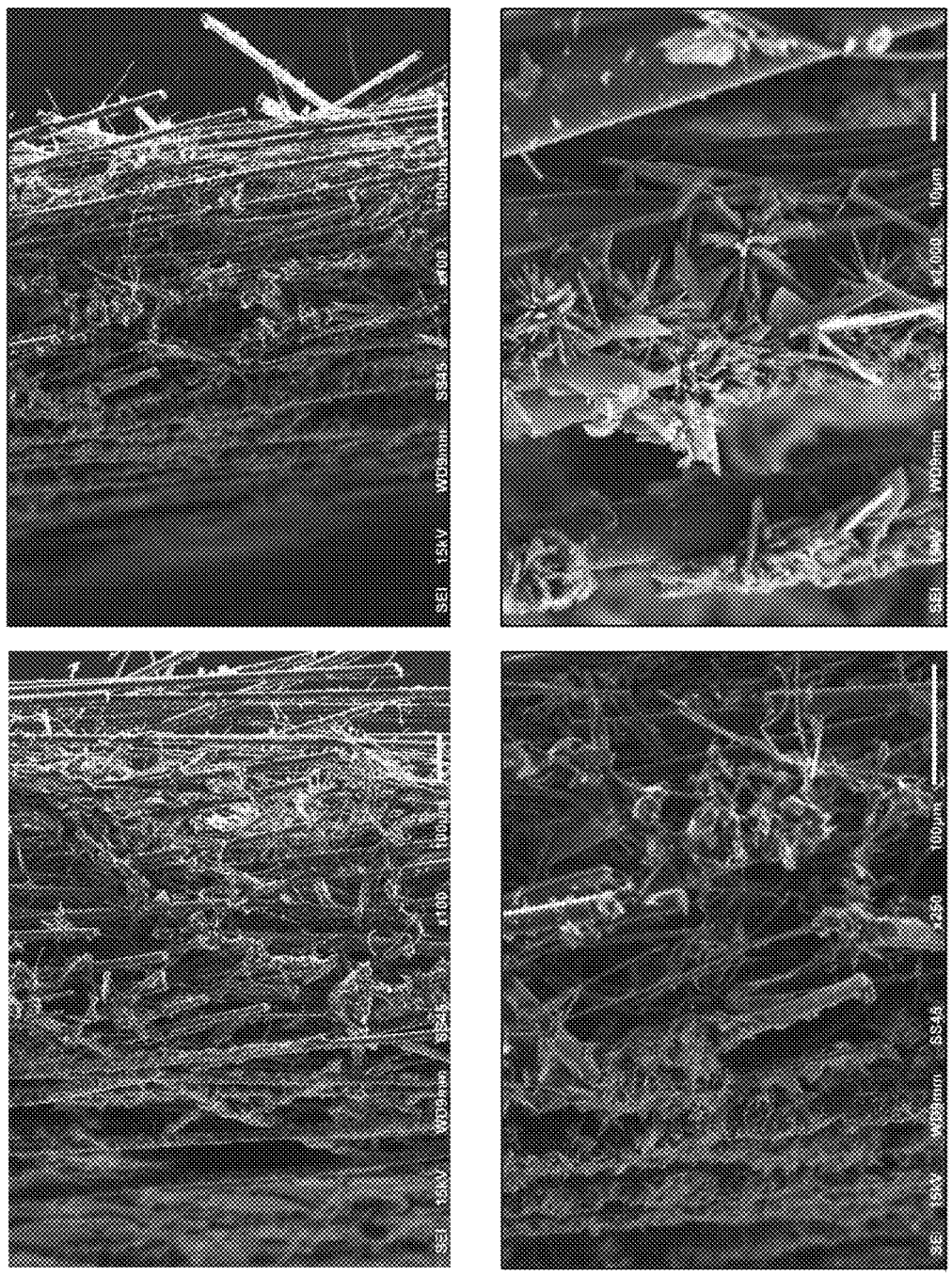
FIG. 2 is a micrograph of glass fiber mat matrix saturated with calcium sulfate crystals.

After the crystallization reaction is completed, a glass fiber mat with gypsum crystals crystallized on glass fibers is dried under an elevated temperature to dehydrate gypsum crystals into insoluble calcium sulfate ($CaSO_4$) crystals. At least in some embodiments, the dehydration step is carried out by drying a fiber glass mat saturated with gypsum crystals in an oven. The drying time and temperature may vary. At least in some embodiments, the drying takes place at the temperature in the range from 100° F. to 400° F. At least in some embodiments, the drying is accomplished at 110° F. for at least one hour. In other embodiments, the drying is accomplished at 400° F. for about 1-5 minutes. FIG. 2 is a micrograph of a glass fiber mat saturated with calcium sulfate crystals as described above.

The inventors have unexpectedly discovered that the porosity of a glass fiber mat saturated with salt crystals is significantly decreased in comparison with a glass fiber mat not saturated with salt crystals. In comparing FIG. 1 with FIG. 2, the inventors have discovered that saturating a glass fiber mat with salt crystals improves consistency of a glass fiber mat and eliminates voids seen in an untreated glass fiber mat of FIG. 1.

After a glass fiber mat is saturated with salt crystals and dried, it can be used for preparing a gypsum product, such as for example a gypsum panel. In this process, a gypsum slurry comprising calcined gypsum is mixed with water and any other components such as fillers, binders, defoamers, biocides and fibers. The slurry is then sandwiched between two glass fiber mats saturated with calcium sulfate crystals. In some embodiments, the slurry is sandwiched between two glass fiber mats saturated with calcium sulfate crystals.

A process of making a gypsum product, including but not limited to a gypsum panel, may involve placing a glass fiber mat saturated with salt crystals onto a conveyor, or onto a forming table that rests on a conveyer, which is then positioned under a discharge conduit of a mixer. In some embodiments, a gypsum product is made with glass fiber mats saturated with crystallized calcium sulfate.

The components of a gypsum slurry are fed to the mixer, where they are agitated to form the gypsum slurry. Foam can be added in the discharge conduit. The gypsum slurry is discharged onto a glass fiber mat saturated with salt crystals. The gypsum slurry is spread, as necessary, over the glass fiber mat and optionally covered with a second glass fiber mat saturated with salt crystals.

The wet gypsum panel is conveyed to a forming station where the panel is sized to a desired thickness, and to one or more knife sections where it is cut to a desired length to provide a cementitious article. The panel is allowed to harden, and excess water is removed using a drying process (e.g., by air-drying or transporting the cementitious article through a kiln).

Figure 3:
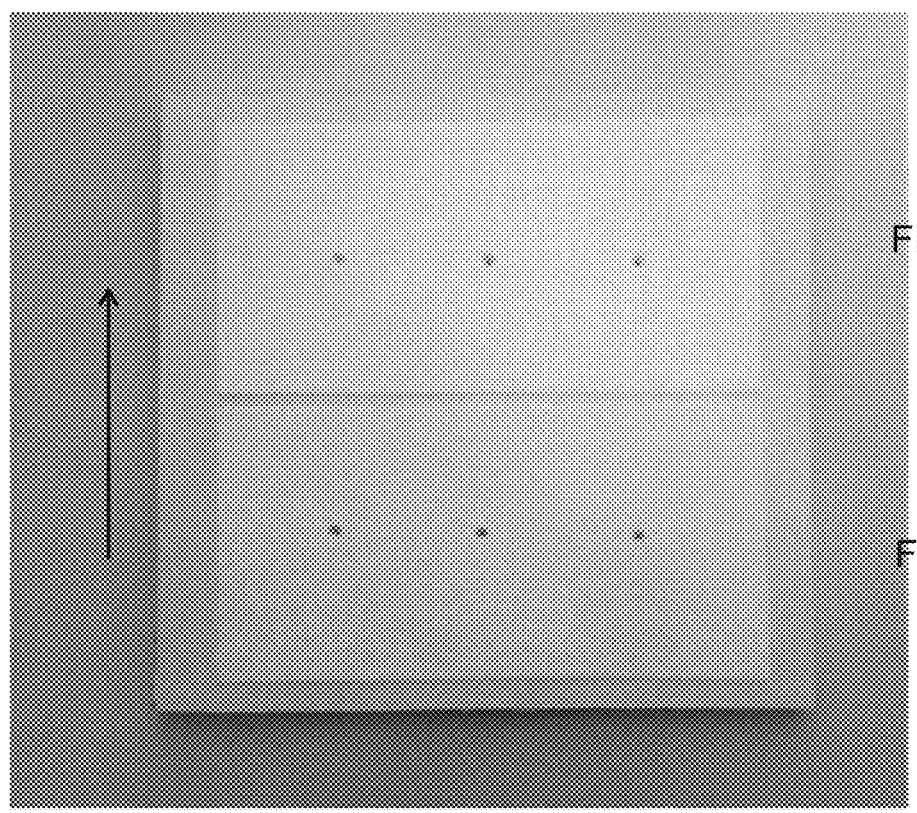
FIG. 3 is a picture comparing after a nail-pull test, a gypsum board covered with an untreated glass fiber mat (FIG. 3A) to a gypsum board covered with a glass fiber mat saturated with calcium sulfate crystals (FIG. 3B)

The inventors have discovered that the strength of gypsum products prepared with a glass fiber mat saturated with salt crystals is improved significantly in comparison to products made with a glass fiber mat which is not saturated with salt crystals. As shown in FIG. 3, a gypsum board made with a fiber glass mat saturated with salt crystals (shown in FIG. 3B) performed better in a nail-pull test in comparison to a gypsum board prepared with a glass fiber mat which was not treated with a salt solution (shown in FIG. 3A).

Nail-pull tests are performed in accordance with the American Society for Testing Materials (ASTM) standard C473-00 and utilize a machine that pulls on a head of a nail inserted in the wallboard to determine the maximum force required to pull the nail head through the wallboard. As shown in Table 1, the inventors have unexpectedly discovered that using a glass fiber mat saturated with salt crystals increases the nail-pull strength of a gypsum product by several units in comparison to a gypsum product prepared with a glass fiber mat not fortified with salt crystals.

TABLE 1

Nail-Pull Test Results

| Sample ID | Crystallization Method | Weight Before (lb/1000 ft²) | Weight After (lb/1000 ft²) | Caliper Before (mils) | Caliper After (mils) | Porosity Before (s/100 cc) | Porosity After (s/100 cc) | Nail Pull Difference* (lb$_f$) |
|---|---|---|---|---|---|---|---|---|
| 5-1 | A | 25 | 55 | 24 | 30 | 0 | 2 | 3.1 |
| 6-1 | B |   | 67 |   | 29 |   | 13 | 4.5 |

*Nail Pull Difference = Ave Nail Pull (Treated Mat) − Ave Nail Pull (Untreated Mat)

This invention will be further explained by means of the following non-limiting examples.

EXAMPLE 1

Solutions of $Na_2SO_4X10H_2O$ (0.1 M) and $CaCl_2$ (0.1 M) were mixed in a pan. The product of the reaction is $CaSO_4X2H_2O$ (gypsum) and NaCl. The mixture was noticed to be turbid in about 3 minutes due to gypsum crystallization. A 6 inches×6 inches piece of glass fiber mat was immersed in the mixture right after the mixing, and soaked for 3 minutes. After the saturation reaction was completed, a glass fiber mat was dried by one of the following methods:

Method A: at 110° F. for one hour; or
Method B: in oven at 400° F. for 3 minutes to dehydrate gypsum crystals to insoluble $CaSO_4$.

Sample gypsum panels were then prepared with the glass fiber mats. Control gypsum panels were prepared with glass fiber mats which were not treated with a concentrated gypsum solution.

All sample gypsum panels were then submitted for a nail-pull test. The results from these tests are reported in Table 1 in which Samples 5-1 and 6-1 represent samples with glass fiber mats saturated with calcium sulfate crystals and dried by Method A (Sample 5-1) or Method B (Sample 6-1). As can be seen from Table 1, gypsum panels with calcium sulfate fortified glass fiber mats performed significantly better in a nail-pull test and provided nearly a two-fold increase in nail-pull strength in comparison to a gypsum panel with an untreated fiber glass mat.

EXAMPLE 2

A glass fiber mat saturated with calcium sulfate crystals was prepared as described in Example 1. A piece of glass fiber mat not treated with salt crystals was used as a control. The untreated glass fiber mat and the glass fiber mat saturated with calcium sulfate crystals were each glued onto a paper face gypsum board using 3M Super 77 spray adhesive for nail-pull resistance test.

FIG. 3 depicts a 12 inches×12 inches gypsum panel with two pieces of 5 inches×10 inches glass mat: untreated fiber glass mat on top (FIG. 3A) and a glass fiber mat saturated with calcium sulfate crystals on the bottom (FIG. 3B). Both gypsum wallboards were subjected to a nail-pull test.

Three dark circles in each glass fiber material in FIG. 3A and FIG. 3B represent locations from which nail-pull tests have been conducted. The more force is needed to be applied to pull the nail through the gypsum panel, the stronger is the fiber glass mat. These nail pull tests were conducted on multiple samples to provide the statistical information of the nail-pull difference between the treated glass mat and the untreated glass mat. It has been determined that saturating a glass fiber mat with salt crystals improves the strength of the mat and a gypsum board made with the mat.

While particular embodiments of the glass fiber mat saturated with salt crystals, the gypsum product made with the mat, and methods of making these items have been shown and described, it will be appreciated by those skilled in the art that changes and modifications may be made thereto without departing from the invention in its broader aspects and as set forth in the following claims.

What is claimed is:

1. A gypsum product comprising a gypsum core sandwiched between two glass fiber mats: a first glass fiber mat saturated with salt crystals selected from gypsum crystals, calcium sulfate, sodium chloride and any combination thereof; and a second glass fiber mat saturated with salt crystals selected from gypsum crystals, calcium sulfate, sodium chloride and any combination thereof.

2. The gypsum product of claim 1 wherein each of the two glass fiber mats comprises glass fibers and wherein the salt crystals are bound to the glass fibers.

3. The gypsum product of claim 1 wherein each of the two glass fiber mats comprises glass fibers and a binder and wherein the salt crystals are bound to the glass fibers.

4. The gypsum product of claim 3 wherein the binder is a styrene acrylic binder.

5. The gypsum product of claim 1 wherein each of the two glass fiber mats comprises glass fibers and wherein at least some of these glass fibers are bound together with calcium sulfate crystals.

6. A method for making the gypsum product of claim 1, the method comprising:
   obtaining a glass fiber mat;
   immersing the glass fiber mat into a solution that can form salt crystals;
   causing salt crystals to crystallize from the solution onto the glass fiber mat and thereby obtaining a glass fiber mat saturated with salt crystals;
   preparing a gypsum slurry; and
   forming a gypsum product by covering the gypsum slurry on at least one side with the glass fiber mat saturated with salt crystals.

7. The method of claim 6, wherein the solution is a gypsum-forming solution.

8. The method of claim 7, wherein the gypsum-forming solution is prepared by mixing together a sodium bisulfate solution with a calcium chloride solution.

9. The method of claim 8, wherein the sodium bisulfate solution and the calcium chloride solution are mixed in the molar ratio 1:1.

10. The method of claim 6, wherein the salt crystals are gypsum crystals.

11. The method claim 6, wherein the glass fiber mat saturated with salt crystals is dried in a dryer after the salt crystals are crystallized on the fiber glass mat.

12. A glass fiber mat comprising glass fibers and the glass fiber mat saturated with salt crystals wherein the salt crystals are crystallized on the glass fibers; wherein the salt crystals are selected from gypsum crystals, calcium sulfate, sodium chloride and any combination thereof.

13. The glass fiber mat of claim 12, wherein the salt crystals are gypsum crystals.

14. The glass fiber mat of claim 12, wherein the glass fiber mat further comprises at least one of the following: a filler, a pigment, a biocide or a fungicide.

15. The glass fiber mat of claim 12, wherein the glass fibers are from about 0.5 to about 2.0 inches long.

16. The glass fiber mat of claim 12 wherein at least 50% of the thickness of the mat is saturated with calcium sulfate dihydrate crystals.

17. The glass fiber mat of claim 16 wherein at least some of the calcium sulfate dihydrate crystals are dehydrated into calcium sulfate crystals.

18. The gypsum product of claim 1, wherein the first glass fiber mat and the second glass fiber mat are saturated with the salt crystals and wherein the salt crystals being crystallized on the glass fiber mat by immersing the first glass fiber mat and the second glass fiber mat into a crystal-forming solution obtained by mixing a sodium bisulfate solution with a calcium chloride solution.

* * * * *